350-96.1 SR

XR 3,328,589

CROSS REFERENCE SEARCH ROOM

June 2 3,328,589

PHOTOELECTRIC APPARATUS FOR PROVIDING PULSING SIGNALS INCLUDING STACKED PLATE FOCUSSING MEANS

Filed April 10, 1963 5 Sheets-Sheet 1

INVENTOR
THOMAS G. FERGUSON, JR.
BY
Robertson & Smythe
ATTORNEYS

3328589
OR IN 250/569

INVENTOR
THOMAS G. FERGUSON, JR.
BY
Robertson & Smythe
ATTORNEYS

INVENTOR
THOMAS G. FERGUSON, JR.
BY
Robertson and Smythe
ATTORNEYS

June 27, 1967 T. G. FERGUSON, JR 3,328,589
PHOTOELECTRIC APPARATUS FOR PROVIDING PULSING SIGNALS
INCLUDING STACKED PLATE FOCUSSING MEANS
Filed April 10, 1963 5 Sheets-Sheet 4

INVENTOR
THOMAS G. FERGUSON, JR.
BY
Robertson & Smythe
ATTORNEYS

June 27, 1967 T. G. FERGUSON, JR 3,328,589

PHOTOELECTRIC APPARATUS FOR PROVIDING PULSING SIGNALS INCLUDING STACKED PLATE FOCUSSING MEANS

Filed April 10, 1963 5 Sheets-Sheet 5

INVENTOR.
THOMAS G. FERGUSON, JR.
BY
Robertson and Smythe
ATTORNEYS

United States Patent Office 3,328,589
Patented June 27, 1967

3,328,589

PHOTOELECTRIC APPARATUS FOR PROVIDING PULSING SIGNALS INCLUDING STACKED PLATE FOCUSSING MEANS

Thomas G. Ferguson, Jr., 30 Stratford Ave., Greenlawn, N.Y. 11740

Filed Apr. 10, 1963, Ser. No. 272,027
7 Claims. (Cl. 250—219)

This invention relates to information conversion systems and especially to an arrangement employing a perforated media reading device, such an arrangement being useful, for example, in automatic telephone dialing or similar apparatus.

It frequently is desirable to be able to dial various telephone stations rapidly and without manual operation. Prior art devices have used cards having information thereon, the cards being moved mechanically relative to a light source or relative to switch contact means on either side of the card. These have been complicated and may be subject to operational difficulties. Magnetic memory devices also have been suggested, but these also require complicated arrangements. Further, the above mentioned systems are not fast and are not sufficiently flexible. An automatic telephone dialing system must be simple with a few moving parts as possible. The cards must be readily made and the unit must be compact. Another problem in some of these and similar systems is the transposition of the signals to a decimal code in a simple manner.

One of the objects of the invention is to provide an automatic dialing device having a minimum of moving parts.

Another of the objects of the invention is to provide a means having a simple compact arrangement for receiving cards and providing signal pulses or information to a dial telephone system.

Still another object of the invention is to provide a means for reading a group of rows of perforated information without moving the card or tape.

A still further object of the invention is to provide a system which can be used for various purposes where a binary or similar code is to be transposed to a decimal code.

Still another object of the invention is to provide a simple information containing card.

The conventional automatic telephone dialing system receives decimal pulses from a pulse device at the telephone, the pulses being used to operate switching equipment at various central exchanges.

In one aspect of the invention, a source of radiant energy is provided, the source preferably being a plurality of rows of vertical light banks. In one form, four lights or an equivalent are employed in each row. A radiant energy receiving means, such as photocell means, is provided to receive energy from said lights or bulbs and further means are provided to convert information therefrom to a decimal system. A card having apertures or transparent areas formed therein according to the information to be transmitted is inserted between the source and receiving means. In the preferred embodiment, one photocell is located opposite each horizontal row of bulbs. Circuitry is provided to successively light the vertical rows of lights, such being activated upon completion of the pulsing in the previous row. In order to provide a compact structure and reduce the number of photocells, a focussing means is provided for each horizontal row, the focussing arrangement being in the form of staggered plates. The reflecting surfaces are made so that the light from any of the vertical rows will be focussed upon its respective photocell. The card may take various forms and may, for example, comprise laminated paper with metal foil having appropriate apertures for the information to be converted to decimal or similar information. A strip or tape may also be used having perforations or areas otherwise transparent to radiant energy of the wavelengths to which the radiant energy receiving means is responsive.

The principles of the invention can be used for providing signals or pulses for various purposes other than telephony, such as automatic fire alarm or burglar alarm purposes, and data transmission.

These and other objects, advantages and features of the invention will become apparent from the following description and drawings which are merely exemplary.

Figures 1, 3, 4:
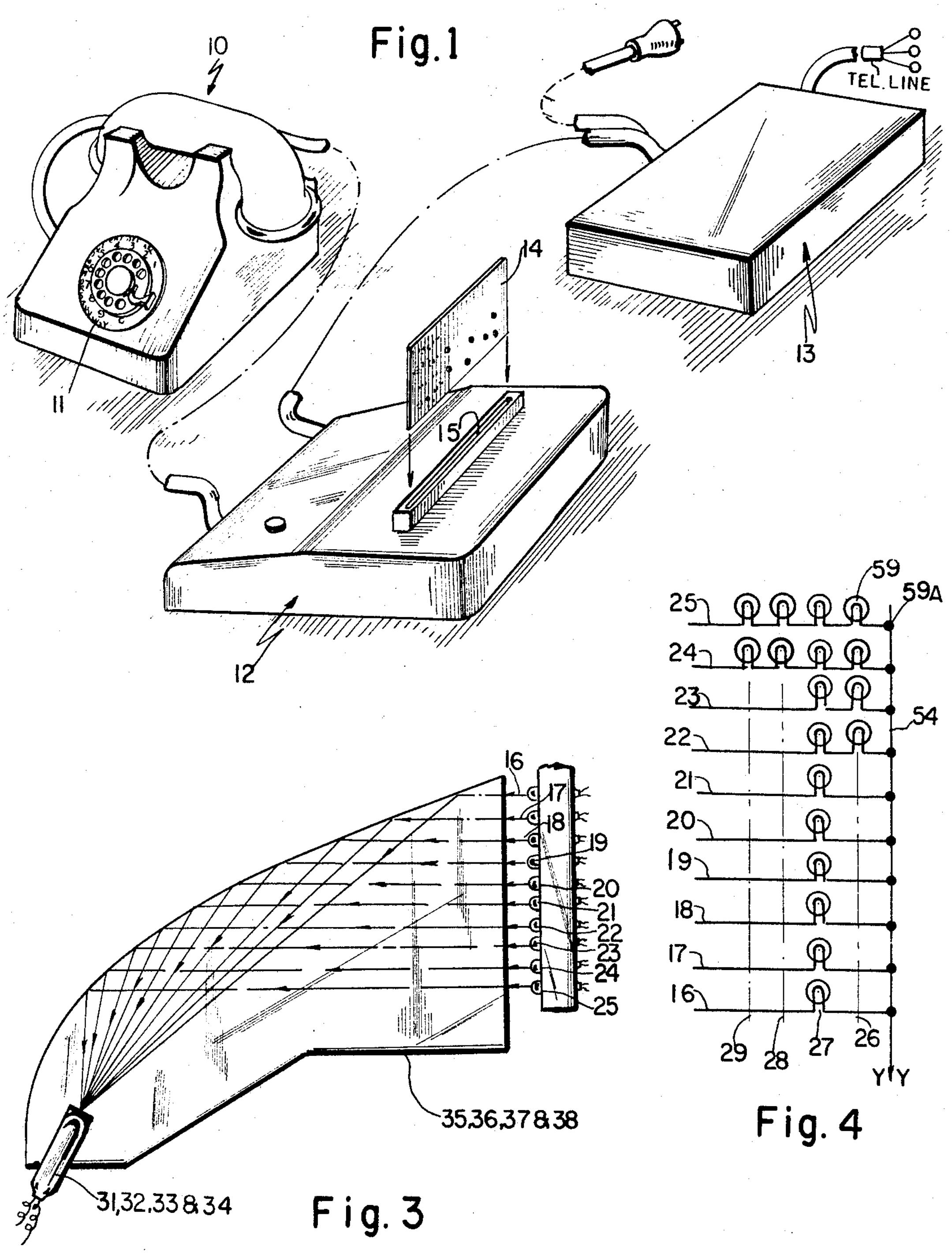
FIG. 1 is a perspective view showing one manner of using the invention.
FIG. 3 is a fragmentary view of a photocell and focussing means.
FIG. 4 is a circuit diagram of the light circuit.

Merely by way of example of one use of the invention, it will be described in conjunction with automatic dialing in telephony, but, as mentioned, it is to be understood that it can be used for other purposes.

A standard telephone 10 (FIG. 1) having a schematically indicated dial means 11 may be used. Card reader 12 is connected to a pulse former 13 which is connected to the telephone circuit leading to the central exchange. Card 14 having the desired information thereon is inserted into slot 15 so as to activate the system and transmit pulses corresponding to the telephone number on the card. As will be described, light will pass through perforations in the cards to activate photocell circuits. Preferably, a modified binary code is used and is transformed into decimal pulses or information.

Figures 2, 10:
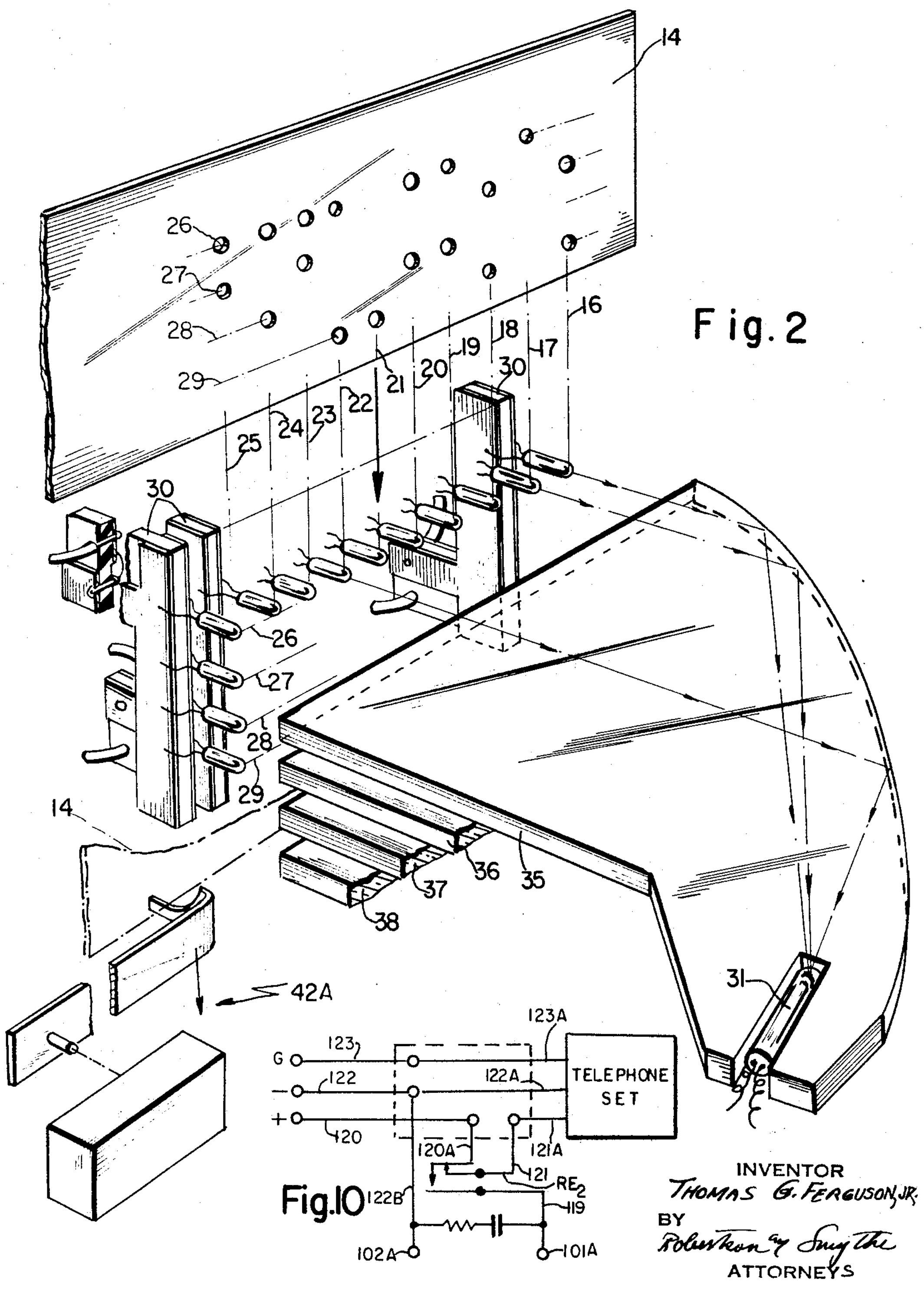
FIG. 2 is a fragmentary enlarged perspective view of the energy source and receiving means.
FIGS. 9 and 10 are circuit diagrams of a scanning arrangement.

Referring to FIG. 2, ten vertical rows of energy or light sources 16, 17, 18, 19, 20, 21, 22, 23, 24, 25 are used together with four horizontal rows 26, 27, 28, 29, or equivalents thereof. At each intersection of a vertical and horizontal, a light or energy source is located or is available when energization is provided, there being forty separate light sources such as miniature lamps of conventional type. The individual vertical light rows may be mounted in a removable clip means 30 having suitable connectors. The lamps in each vertical row are electrically connected in parallel so that all of the lights in a vertical row will be illuminated when the row is activated by the scanning means. If the lamps in each vertical row are matched for relatively equal filament resistance, they may be connected in series, thereby providing the automatic disconnection of one entire vertical row if any one lamp in that row fails. In this way, the photocell circuit will sense the difficulty rather than transmit an incorrect signal. Each row is illuminated in sequence by a programming circuit so that when a card is inserted in the device, light will pass through the perforated areas of the vertical row being scanned in a manner to be described hereafter.

Instead of forty light sources, ten light sources may be used, each consisting of one lamp long enough to extend across each horizontal area of a vertical row which directs light to a radiant energy sensitive device.

Only four radiant energy sensitive devices, such as photocells, are required in the system illustrated. These are seen at 31, 32, 33, 34 (FIGS. 2, 6, 7), each being inserted in a slot in a clear plastic shaped lens arrangement or plate 35, 36, 37, 38, respectively. The transparent lens plates are separated by opaque plates 39, 40, 41 with cover plates 42, 43A. Each transparent lens has a continuous edge opposite its respective horizontal row of lamps or light sources. As an example, methyl methacrylate plastic transparent lens plates can be employed.

Each transparent lens or plate 35, 36, 37, 38 is shaped to focus parallel light entering from the light sources, such being accomplished by internal reflection from outer edges of the lens plates. The focussing is carried out by use of a parabolic segment with the photocell for the layer or plate at the focal point of its parabola. The maximum incident angle must be less than the critical angle for the particular transparent material employed. In this manner, total internal reflection will be assured without use of reflective surfacing material. The light sensitive areas of the photocells in the plates are directed along a line bisecting the angle between the light rays from lamps 16 and 25 so as to give maximum sensitivity over the entire scanning sweep of the rows of lamps.

Figures 5, 6:
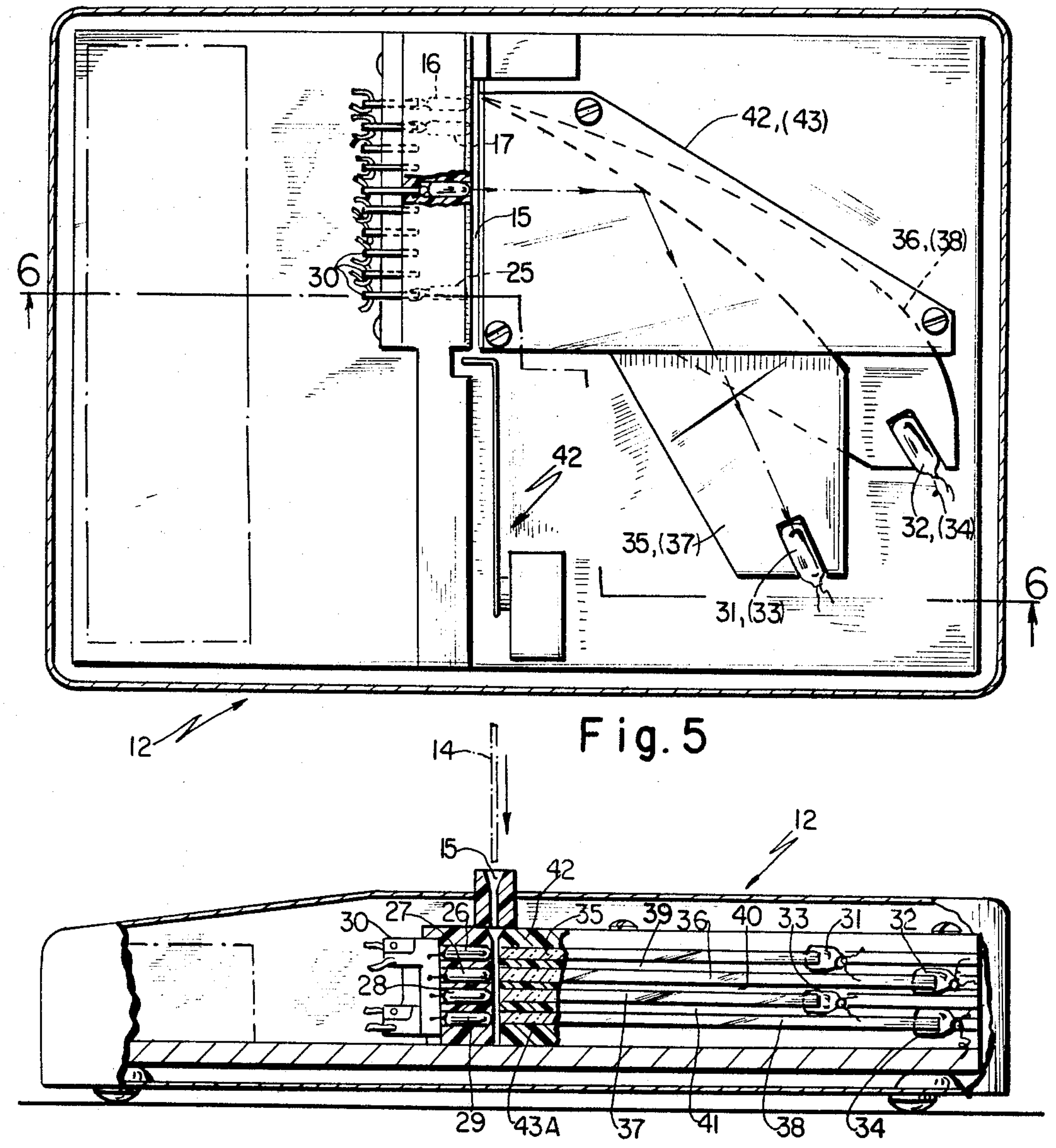
FIG. 5 is a sectional view showing the structure.
FIG. 6 is a section along line 6—6 of FIG. 5.

As an example, the center-to-center distance between card perforations can be made 0.200 inch both vertically and horizontally. Thus, the centerline spacing of the transparent lens will be 0.200 inch. In order to accommodate the thickness of the photocells, two curves are chosen for alternate layers so that the photocells can be staggered as seen in FIG. 5, allowing the distance between the centerline of one transparent layer and the centerline of an adjacent transparent layer to be less than the diameter of the photocells employed. More than two parabolic shapes may be used if spacing requires it. Parabolic focussing plates may also be stacked so that alternate layers curve to the right and to the left, thus providing added space for the placement of photocells.

When a card is placed in the slot and a vertical row of lights activated, the light will pass through perforations in the card which will cause the respective photocell to change condition or to pass current.

As mentioned, there are several parabolic shapes which will fulfill the optical design requirements, two convenient curves being illustrated. The location of the focus for the shape seen at 35, 37 is different from that for the shape of layers 36, 38. Since the photocell for each layer must be at the focus, it is not necessary that the photocells for the various layers be stacked directly above one another. By stacking in alternate positions, photosensitive elements up to 0.400 inch in diameter may be used. There may be two or more alternate positions.

The configuration of the edge curve to be used requires that light may enter the edge of any transparent layer anywhere within a two-inch distance across the flat edge and that as rays of light strike the back surface, they will be reflected at such an angle that they are directed to the focal point of a parabola. The maximum incident angle of light rays striking the back surface must not exceed the critical incident angle of acrylic plastic.

The general parabolic formula may be stated as $y^2=2ax$, and from this can be calculated the requisite shapes.

The card reading device uses the optical system previously described to conduct light from illuminated sources to photosensitive elements, but relies on electric circuitry to convert the signals from the photocells into a useable output. The device being described here has a capacity of ten digits, there being ten vertical rows, but this capacity can be extended to thirteen, fifteen or twenty, or what ever digit capacity the application requires. As an example, 24 volt D.C. power can be applied to the terminals 40A and 41A. Voltages other than 24 volts also can be employed by the selection of proper components.

When the perforated card is inserted in slot 15 (FIGS. 1, 5, 6), normally open switch 42C is actuated by the weight of the card and closes a circuit between terminals 40A and 42B which will provide power for initiation of operation of the device.

Figure 8:
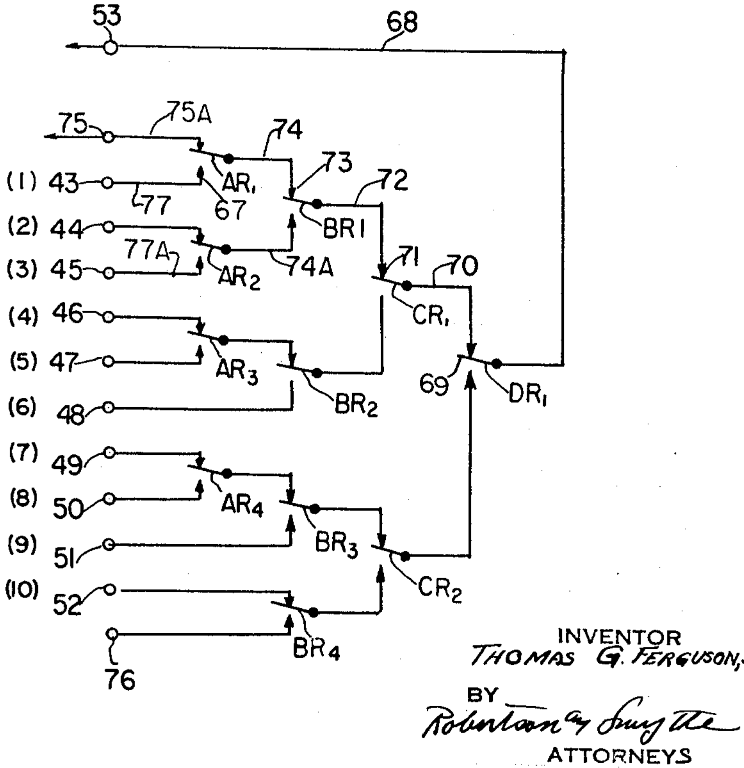
FIG. 8 is a circuit diagram of the means for changing to a decimal code.
Figure 9:
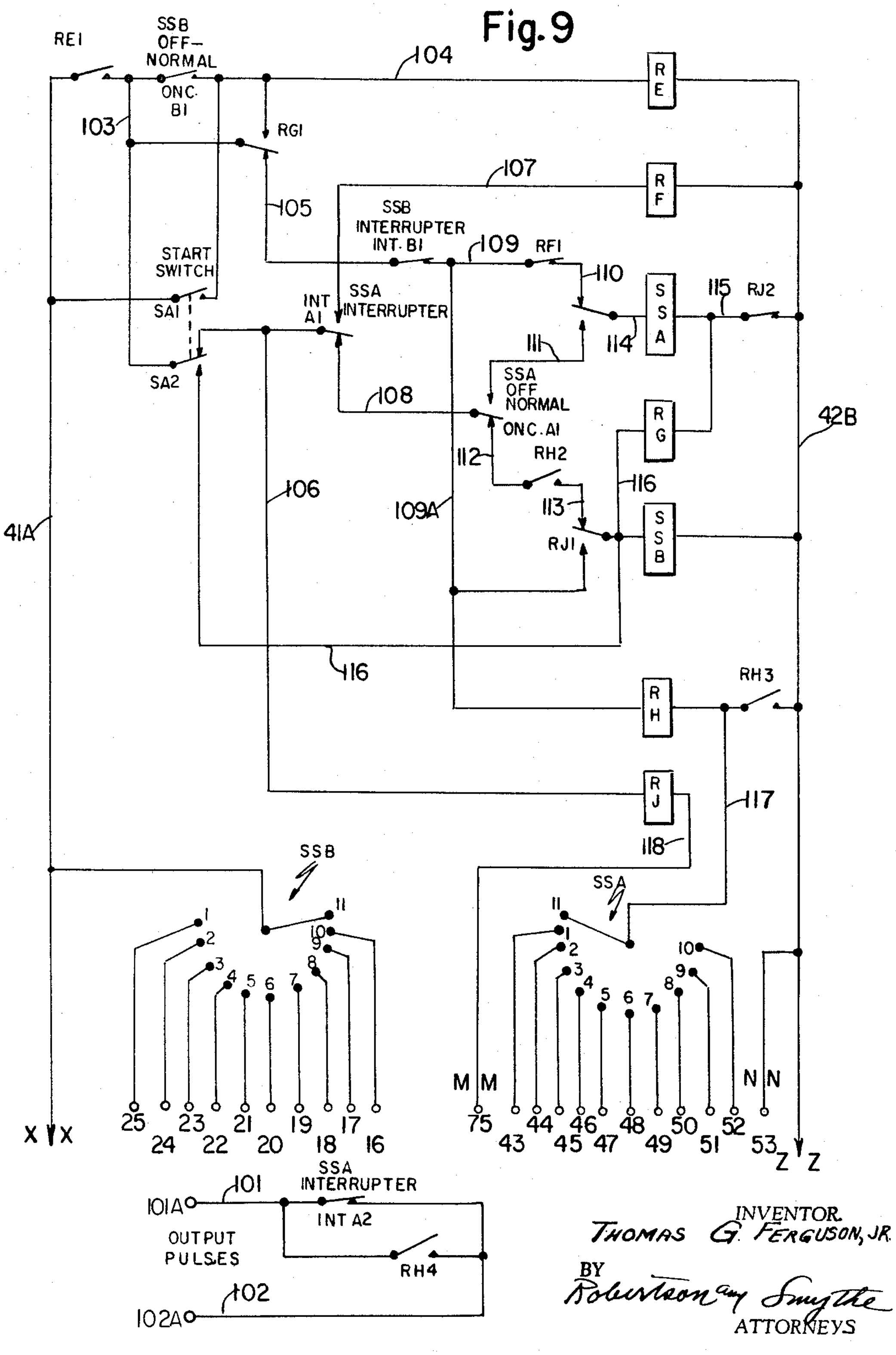

Connector pins 43 through 52 (FIG. 8), inclusive, correspond to a decimal output from the pulse former 13, the schematic circuit for which is shown in FIG. 9. A circuit from connector pin 53 to any one of the decimal output positions is set up by the actuation of relays A, B, C and/or D. These four relay coils respond, through a transistor switching circuit, to a decrease in resistance of photocells 31, 32, 33 and/or 34. The decrease in resistance across a photocell occurs when light from one of the reading lamps of the row energized is transmitted through its respective transparent lens plate and directed to its photocell.

To set up a desired circuit path from connector pin 53 to any one of the decimal outputs 43 to 52, inclusive, external connections must be made to activate the reading lamps as will be described later. Resistor 58 is introduced in series with the lamps (FIGS. 4, 7) merely to set the voltage across the reading lamps of FIG. 4 at an acceptable value. Point Y—Y of FIG. 4 is connected to Y—Y of FIG. 7.

Card perforation positions are coded in a modified binary pattern. The contacts of relays A, B, C and D convert the binary code to a decimal output. A perforation in row 26 (FIGS. 2 and 6) actuates relay A; row 27 actuates relay B; row 28 actuates relay C; and row 29 actuates relay D.

The switch blades $AR_1$, $AR_2$, $AR_3$, $AR_4$ are actuated by relay AR, the blades being shown (FIG. 8) in the unenergized condition of relay coil AR. Similarly, switch blades $BR_1$, $BR_2$, $BR_3$ and $BR_4$ are actuated by relay coil BR; switch blades $CR_1$, $CR_2$ by relay coil CR; and switch blade $DR_1$ by relay coil DR.

For convenience, in the following table, the punch code designation is similar to the relay actuated when the energy passes through the row and relay designated thereby.

Any digit from 1 to 0 may be coded on the card by using not more than two perforation positions out of a possible four.

| Digit to be programmed | 1 | 2 | 3 | 4 | 5 | 6 | 7 | 8 | 9 | 0 |
|---|---|---|---|---|---|---|---|---|---|---|
| Card Punch Code | A | B | A B | C | A C | B C | D | A D | B D | C D |

As an example, if the card perforations in vertical row 25 are to be "read," to obtain a pulse from the proper decimal terminal, light source 59 (FIG. 4) must be turned on. This is accomplished by externally connecting pin 25 with the common negative power input 41A. Power is then supplied to reading lamp 59 and the other lamps in the row through lead 40A, switch 42C, lead 42B, dropping resistor 58 and lead 54 to connector pin 59A. As reading lamp 59 comes on, light is directed against the card and where the card is perforated, light passes through to the edge of the respective transparent lens plate and hence to its respective photocell.

As an example, if the first digit to be programmed is 1, the card would be perforated in row 26. Light then passes through lamination 35 and is reflected to photocell 31. When light strikes photocell 31 (FIG. 7), the photocell resistance decreases and relay coil AR is actuated through a transistor switching circuit as will now be described. As the photocell 31 (FIG. 7) resistance decreases between lead 61 and lead 41A, the potential between lead 61 and lead 42B increases. Diode 62 tends to block very small voltages but will conduct as the potential increases. When transistor 63 permits sufficient current to flow between lead 64 and lead 65, relay coil AR is actuated. The sensitivity of the switching circuit is calibrated by placing a proper resistance value at 60.

Diode 66 is connected across relay coil AR such that forward voltages are blocked and directed entirely through the relay coil. Reverse voltages, which may occur from the switching of the inductive relay coil or from external sources, are bled off by diode 66, thus preventing damage to the transistor 63. Such also smooths the operation of the relay when the D.C. power input comes from half or full wave rectification without sufficient capacitance across the line.

Since a card perforation at row 26 actuates only relay AR, the switch blade $AR_1$ moves to a lower contact 67 of the first switch, the other blades $AR_2$, $AR_3$, $AR_4$ also moving but being ineffective as will be seen. This sets up a circuit path from common connector pin 53 to pin 43, or decimal code digit 1, through lead 68, switch blade $DR_1$, contact 69 (switch blade $DR_1$ not having been actuated), lead 70, switch blade $CR_1$, contact 71 (switch blade $CR_1$ not moving), lead 72, switch blade $BR_1$, contact 73 (switch blade $BR_1$ not having moved), lead 74, switch blade $AR_1$, contact 67 (blade $AR_1$ having moved down because relay AR was actuated) and lead 77.

By using this same system, any digit may be programmed if the proper card perforation pattern is placed between the light source and the stack of transparent laminations backed by photocells, the change in position of one or two relays as set forth in the above table effecting movements of the switch blades to obtain any decimal digit. Any reading lamp which is activated will illuminate its vertical row of perforation positions.

If no relay is energized, output position 75 is connected to pin 53. This circuit path can be used as a constant signal indicating the no decimal output is connected. It can also be used to sense blank rows on the card if the circuit path from pin 53 to pin 75 is checked each time a reading lamp is energized.

If a special coded input BCD is introduced by the card, a circuit path is set up between output positions 53 and 76. This extra position can be used for any auxiliary function, such as actuating a time delay or for stopping until the next or external signal continues cycling. Switch blade $BR_4$ actuated by relay coil BR can be used for this purpose.

The card reading device offers complete flexibility of programming because the reading lights may be externally controlled and activated in any desired sequence. The circuit paths set up between connector pin 53 and pins 43 through 52, inclusive, may also be electrically isolated from other parts of the device and may therefore operate on independent circuits and on other voltages.

Figure 7:
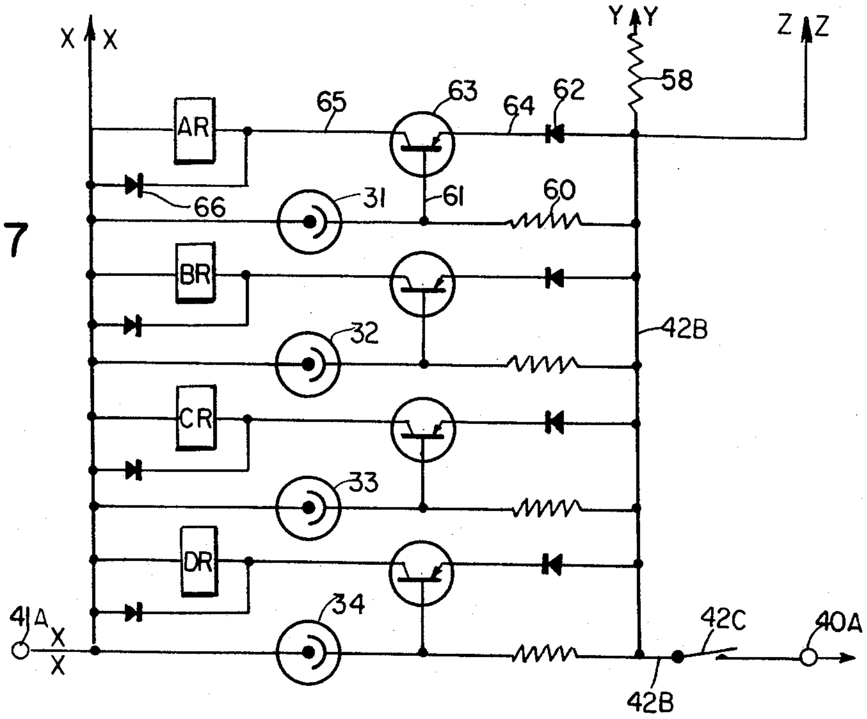
FIG. 7 is a circuit diagram of a transistor triggering circuit.

For operation of the device, D.C. power must be made available to terminals 40A and 41A (FIG. 7). When a card 14 is inserted in the card slot 15, the card closes switch 42C to provide power to lead 42B. To start the pulsing cycle, the manual start switch SA1, SA2 (FIG. 9) is depressed which closes the normally open contacts of switch SA1 between lead 41A and lead 104, providing power to relay coil RE. Energization of relay coil RE will cause contact RE1 to close so that D.C. power will be provided (negative polarity) to lead 103 through lead 41A and contact RE1. The switches operated by a relay coil are given the operating coil designation plus a numeral to identify the particular switch contacts involved.

Depressing the start switch also moves switch SA2 from its normally closed to its normally open position. Such connects stepping switch coil SSB to D.C. power through lead 41A, switch RE1, lead 103, switch SA2, and lead 116. Since relay switch RJ2 remains in its normally closed position, relay coil RG also wil be energized. Switch RG1 then transfers its position to the normally open position and completes a path from lead 103 to lead 104 so as to provide a holding circuit for relay coil RE.

When the manual start switch is released, switch SA1 opens. However, relay coil RE is held by power through lead 41A, switch RE1, lead 103 and the armature of switch RG1 and lead 104 (negative polarity). The positive line is connected thereto through lead 42B. As the manual start switch is released, contact SA2 breaks the connection between lead 103 and lead 116 to stepping switch coil SSB and relay coil RG.

Stepping switch SSB is of a conventional commercially available type which cocks a spring when the coil is energized, but does not move its wiper to the next step position until the coil is de-energized. The stepping switches used have both "off-normal" and "interrupter" contacts as is known in the art. The off-normal contacts are abbreviated ONC, and the interrupter contacts are abbreviated INT. As coil SSB is released, the off-normal switch ONC B1 of stepping switch SSB closes and completes another holding circuit for relay coil RE by connecting leads 103 and 104.

Relay coil RG is of the slow releasing type with a release delay sufficiently long to hold its connection between lead 103 and 104 until after the wiper contact of stepping switch SSB has advanced from position 11 to position 1 and its off-normal switch ONC B1 has closed. In this way, the holding circuit for relay coil RE is maintained without interruption.

Relay coil RE is then held for the remainder of the pulsing cycle through lead 41A, switch RE1, lead 103, switch ONC B1, lead 104 (negative), and lead 42B (positive).

After relay coil RG is released, the blade of contact RG1 returns to its normal closed position between leads 103 and 105 and stepping switch coil SSA is actuated through lead 103, contact RG1, lead 105, switch INT B1, lead 109, switch RF1, lead 110, switch RH1, lead 114 (negative), lead 42B, contact RJ2, and lead 115 (positive).

Stepping switch SSA and relay RF operate alternately at a preset speed, each interrupting the other's holding circuit and producing a series of pulses by the opening and closing of stepping switch SSA interrupter switch INT A2.

As stepping switch coil SSA is actuated, interrupter contacts on the stepping switch are also actuated. The armature of switch INT A1 closes its normally open position and this actuates relay coil RF through lead 103, switch SA2, lead 106, switch INT A1, lead 107 (negative) and lead 42B (positive). At the same time, normally closed stepping switch INT A2 opens and causes the beginning of an output pulse by disconnecting lead 101 from lead 102. Leads 101 and 102 may be suitably connected into a telephone (FIG. 10) or other circuit to which the pulses are applied, switches INT A2 and RH4 being operated by coils SSA and RH, respectively.

Relay coil RF has a calibrated operate delay time set to produce a circuit break interval of a desired duration between leads 101 and 102. Switch INT A2 will remain open for a length of time equal to the operate time delay of relay RF plus the release time of stepping switch SSA. After the operate time delay of relay coil RF has elapsed, switch RF1 opens and disconnects stepping switch coil SSA.

Releasing coil SSA allows the stepping switch interrupter contacts to return to their normal positions. Stepping switch interrupter switch INT A2 closes and reconnects leads 101 and 102, thus ending the output pulse. The armature of switch INT A1 disconnects relay coil RF by breaking the circuit between leads 106 and 107 by moving downward in FIG. 9. As stepping switch coil SSA is released, the wiper contact or blade of the switch is advanced from position 11 to position 1.

Relay coil RF also has a release delay and switch RF1 closes only after this delay. Switch INT A2 must remain closed a prescribed length of time to produce the proper make interval between pulses, and the release delay of relay RF is set so that its release time plus the time to actuate stepping switch SSA (and reopen switch INT A2) is of proper duration.

It can be seen from the foregoing that one complete pulse cycle is equal to a break interval plus a make interval. It is to be understood that variations in pulsing rate are of course possible.

Since telephone dialing is one instance where a series of pulses or line interruptions is used, the pulsing device will be described in conjunction with dialing of a telephone number.

To dial the first digit, switch INT A2 must be opened and closed as many times as the numerical value of the digit. For example, if the complete number to be dialed is 368–5340, the first digit is 3. This requires three consecutive break-make cycles. The timed interruptions by switch INT A2 will provide such pulsing.

To correctly dial any digit, it is necessary to terminate the pulse signal after the proper number of interruptions. To accomplish this, any one of the step terminal positions of stepping switch SSA may be grounded to the common positive lead 42B. This is accomplished through the selector circuit shown in FIG. 8.

To dial the digit "3" as the first of a series of digits, pulses by interrupter switch INT A2 must stop after three have been made. Three pulses will have been completed when the wiper blade of stepping switch SSA advances to position 3. After interrupter switch INT A2 of stepping switch SSA has produced the third interruption of the telephone line, and its wiper has advanced to position 3, relay coil RH will be actuated.

Power is provided to one side of relay coil RH through lead 41A, switch RE1, lead 103, switch RG1, lead 105, switch INT B1, and lead 109 (negative polarity). To complete a circuit to actuate relay coil RH, some connection must be made between lead 117 and the positive common lead 42B, and such can be accomplished by the selector circuit shown in FIG. 8.

When stepping switch SSB advanced its wiper to position 1, power was supplied to the first row of lamps shown at connection 25. Since the digit to be dialed is 3, perforations have been made in rows A and B of card 14 to allow light to pass and actuate relays AR and BR (FIG. 7). These relays are actuated by photocells and the transistor switching circuit previously described. As relays AR and BR are actuated, a circuit path is established between connection points 53 and 45 through lead 68, switch DR1, lead 70, switch CR1, lead 72, switch BR1, lead 74A, switch AR2 and lead 77A. Since point 53 is connected to common lead 42B and point 45 is connected to wiper position 3 of stepping switch SSA, relay coil RH will be actuated when stepping switch SSA advances to position 3.

As relay coil RH is energized, contact RH3 closes, thereby bypassing stepping switch SSA and forming a holding circuit for relay coil RH. The holding circuit is through lead 117, contact RH3 and lead 42B. Contact RH4 also closes when relay coil RH is energized to provide a shorting path across switch INT A2. Since switch INT A2 provides dialing pulses, as long as contact RH4 is closed between lead 101 and lead 102, no further interruptions of the telephone line can occur.

As relay coil RH is energized, the armature of switch RH1 moves to its normally open position and a circuit is completed to stepping switch coil SSA through lead 103, switch SA2, lead 106, switch INT A1, lead 108, contact ONC A1, lead 111, contact RH1, lead 114 (negative), lead 42B, contact RJ2 and lead 115 (positive). Since stepping switch coil SSA is then in series with its own off-normal switch (switch ONC A1) and interrupter switch (switch INT A1), it becomes self-interrupting and will step rapidly through all remaining wiper positions until it reaches its off-normal or "home" position (position number 11).

When stepping switch wiper SSA advances to position number 11, the armature of off-switch normal ONC A1 moves to its normally closed position and completes a circuit which energizes stepping switch coil SSB through lead

103, switch SA2, lead 106, switch INT A1, lead 108, switch ONC A1, lead 112, switch RH2, lead 113, switch RJ1, lead 116 (negative) and lead 42B (positive). In the circuit path energizing stepping switch coil SSB, it should be noted that when the switch blade ONC A1 moved to its normally closed position, it disconnected the normally open position and thereby opened the circuit providing power to stepping switch coil SSA. As stepping switch coil SSB is energized, the coil of relay RG is also energized since the two are connected in parallel. Also, as stepping coil SSB is energized, switch INT B1 opens. This breaks the circuit between leads 105 and 109, thereby disconnecting relay coil RH.

Relay RH has a release delay time sufficiently long to allow a firm positive mechanical cocking action to take place in stepping switch SSB. It is not until after the release delay of relay RH has elapsed that switch RH2 opens and releases stepping switch coil SSB. Such advances the wiper of stepping switch SSB from position 1 to position 2 and also closes switch INT B1. When switch RH2 opens, switches RH1, RH3 and RH4 also move. The blade of switch RH1 moves to the normally closed position and by connecting lead 110 and lead 114, provides a portion of the circuit necessary for the operation of stepping switch coil SSA. Switch RH3 opens, preventing the actuating or relay coil RH until a circuit path is again set up through the wipers of stepping switch SSA. Switch RH4 opens, thereby allowing subsequent movements of switch INT A2 to cause interruptions of the telephone line.

After switch INT A2 closes at the completion of the first digit, there must be a pause to allow the telephone exchange equipment to recognize that the circuit interruptions for the first digit are completed and that the next series of interruptions will represent another separate digit.

Since relay coil RG and stepping switch coil SSB are disconnected simultaneously, and since relay RG is of the slow release type, the blade of switch RG1 will not return to its normally closed position until after the wiper of stepping switch SSB moves from position 1 to position 2. This time delay is sufficient to provide the proper interdigit pause for telephone dialing, but may of course be altered for other applications.

The release delay of relay RG also provides time to allow one row of "reading" lamps to go off and another row to come on. As the wiper of stepping switch SSB advances from position 1 to position 2, the second row of lamps, connected to lead 24, comes on and a combination of relays AR, BR, CR or DR is actuated in accordance with the card perforations which are opposite the illuminated lamps.

When the blade of switch RG1 moves to the normally closed position, stepping switch coil SSA is actuated through lead 103, switch RG1, lead 105, switch INT B1, lead 109, switch RF1, lead 110, switch RH1 and lead 114 (negative), lead 42B, switch RJ2 and lead 115 (positive).

As stepping switch coil SSA is actuated, the armature of switch INT A1 moves to the normally open position and actuates relay coil RF. Stepping switch SSA and relay RF operate alternately at a preset speed, each interrupting the other's holding circuit and producing a series of telephone line interruption pulses by the opening and closing of stepping switch interrupter switch INT A2. This is a repetition of the circuit sequence which caused dial pulsing interruptions when the first digit was being dialed.

Since, in this example, the second digit to be dialed is a "6," dial pulsing interruptions must stop after the sixth interruption. This means that the coil of the digit terminating relay RH must be energized as the wiper contact of stepping switch SSA moves to position number 6.

By perforating card 14 at positions B and C, the second row of lamps will energize relay coils BR and CR and set up a circuit path such that, as the wiper of stepping switch SSA advances to position 6, relay coil RH is energized.

This same method of programming each digit is used for as many digits as are required. Stepping switch SSA determines the arithmetic value of each digit and stepping switch SSB determines the sequence in which the digits are to be dialed.

After dialing the proper number of digits, it is necessary to terminate the automatic dialing cycle. The maximum number of digits which can be dialed is determined by the number of stepping positions on switch SSB. The circuit schematic shows an eleven-position switch with ten digit capacity. (The eleventh position is the "home" or "off" position and must be left open.) Using standard commercially available components, it is possible to provide a dialing capacity of many more than ten digits.

In the circuit described herein as an example, the dialing capacity is ten digits. If ten digits have been dialed, stepping switch SSB then advances to position 11 and the off-normal switch ONC B1 of the steppng switch opens. This disconnects the holding circuit for relay coil RE by breaking the connection between lead 103 and lead 104. Since relay coil RG is of the slow releasing type and is in parallel with stepping switch coil SSB, there will be a delay before the armature of switch RG1 returns to the normally closed position. Switch ONC B1 and the normally open position of switch RG1 are in parallel with one another and both constitute holding circuits for relay coil RE. With switch ONC B1 already open, relay coil RE will release when the armature of switch RG1 returns to its normally closed position. Releasing relay coil RE opens switch RE1 and breaks the circuit between lead 41A and lead 103, thereby cutting off all power to the circuit components.

If it is desired that the dialing cycle be terminated after the dialing of fewer than ten digits, it is necessary that the step positions of stepping switch SSB be programmed in such a way that the unnecessary step positions are quickly passed over and the wiper returns to position 11. In the sample circuit, only seven digits are arranged to be dialed. After the dialing of the seventh digit, the wiper of stepping switch SSB advances to position 8. Since no number is to be dialed, there will be no perforations in the eighth column of the card and no light will be transmitted to any of the photocells. Therefore, relays AR, BR, CR and DR will all remain in their "off" positions and a circuit path will be established between connection 53 and connection 75 (FIG. 8) through lead 68, switch $DR_1$, lead 70, switch $CR_1$, lead 72, switch $BR_1$, lead 74, switch $AR_1$, and lead 75A. Relay coil RJ will then be energized through connection 75 and lead 118. This opens switch RJ2 which disconnects stepping switch coil SSA and relay coil RG. With stepping switch coil SSA out of the circuit, the stepping switch interrupter switch INT A2 cannot move and further pulse interruptions are impossible.

Energizing relay coil RJ also moves the armature of switch RJ1 to the normally open position and completes a circuit to stepping switch coil SSB by connecting lead 109 and lead 116. Since relay coil RG is disconnected, switch RG1 remains in its normally closed position, and the circuit path to stepping switch coil SSB is through lead 103, switch RG1, lead 105, switch INT B1, lead 109, switch RJ1, lead 116 (negative) and lead 42B (positive).

The coil of stepping switch SSB is then in series with its own normally closed interrupter switch INT B1 and therefore becomes self-interrupting as long as relay coil RJ is energized.

Each step position of switch SSB which programs lights where there are no card perforations will act to hold relay coil RJ in its energized position and therefore continue the self-interrupted stepping of stepping switch SSB.

In the example being described, step positions 8, 9 and 10 of stepping switch SSB are not needed since only seven digits are to be dialed.

When the stepping switch SSB moves to position 11, the dialing cycle is terminated by the opening of off-normal switch ONC B1 and the subsequent release of relay coil RE. When relay coil RE is disconnected, switch RE1 opens and all power from lead 41A is cut off, thus terminating the pulsing cycle.

If the circuit described above is to be used for telephone dialing, leads 101 and 102 (ending at connections 101A and 102A, respectively) must be connected into the telephone line and FIG 10 shows such connections. Leads 120, 122 and 123 comprise a standard telephone line coming into a subscriber location. Leads 121A, 122A and 123A comprise the telephone line leading to a standard telephone instrument, designated "telephone set." With no modification or attachment to the standard telephone set, automatic dialing is made possible by relay contact RE2 which switches the telephone set out of the circuit just prior to dial pulsing and returns it to the line when dialing has been completed.

When relay RE is energized at the beginning of the dialing cycle, contact RE2 completes a circuit between leads 120A and 119. Contact RE2 is of the standard "make before break" type (Form D) and therefore maintains a connection across the telephone line at all times while switching. After lead 119 has been connected, lead 121 is disconnected and the telephone set is therefore likewise disconnected. A short circuit has in this way been established across the telephone line through lead 120, lead 120A, switch RE2, lead 119, connection 101A, lead 101, switch INT A2, lead 102, connection 102A, lead 122B and lead 122.

It is to be understood that reflective surfacing material, such as metallizing by vacuum deposition, can be applied to the reflecting surfaces. This will virtually eliminate light leakage and somewhat increase the optical efficiency of the system. For most applications, satisfactory operation can be attained without the use of metallized or other externally applied reflective surfaces on the focussing plates. When external reflective surfacing material is used, the critical angle of the light conducting material may be exceeded.

It should be apparent from the foregoing description that the invention can be used for various purposes and that variations therein may be made without departing from the spirit thereof as recited in the appended claims.

What is claimed is:

1. In an apparatus for optically providing signals, the combination including radiant energy supplying means, at least two stacked plate radiant energy focussing means having different focus zones, radiant energy responsive means for each focussing means located in spaced relation, and means for placing selective radiant energy controlling means between said radiant energy supplying means and said focussing means so as to control energization of said radiant energy responsive means in accordance with information on the selective radiant energy controlling means.

2. In an apparatus as in claim 1, including a plurality of radiant energy receiving and responsive means, and card means having radiant energy passing apertures for controlling energization of selected ones of said radiant energy receiving and responsive means, said card means including perforations therein corresponding to stored information to be retrieved for programming pulsing apparatus.

3. In an apparatus as in claim 1, including a plurality of radiant energy receiving and responsive means, and circuitry means transforming radiant energy received by said radiant energy receiving and responsive means to signals for programming pulsing apparatus.

4. In an apparatus as in claim 1, including a card for dial pulsing comprising a laminated paper and metal foil structure, said laminated structure having perforated information storage apertures therethrough.

5. In an apparatus for optically providing signals, the combination including a plurality of rows of successively operable light sources, stepping switch means for successively energizing said rows of light sources, plate light source focussing means, a plurality of stacked photocells, one in each of said focussing means for receiving light from said sources, fixed slot means between said light sources and photocells for receiving card means having perforations therein, said perforations being arranged in accordance with information to be retrieved, and energy transforming means actuated by said photocells to provide pulsing signals.

6. In an apparatus as in claim 5, wherein said plate light source focusing means includes at least two stacked plate radiant energy focusing means.

7. In an apparatus for optically providing signals, the combination including a plurality of rows of successively operable light sources, stepping switch means for successively energizing said rows of light sources, plate light source focussing means having parabolic-like reflecting surfaces, a plurality of stacked photocells, one in each of said focussing means for receiving light from said sources, fixed slot means between said light sources and photocells for receiving card means having perforations therein, said perforations being arranged in accordance with information to be retrieved, and energy transforming means actuated by said photocells to provide pulsing signals.

References Cited

UNITED STATES PATENTS

| | | | |
|---|---|---|---|
| 1,890,504 | 12/1932 | Ferguson | 161—220 |
| 2,505,069 | 4/1950 | Savino | 250—219 X |
| 2,605,965 | 8/1952 | Shepherd | 250—219 X |
| 2,668,877 | 2/1954 | Gent et al. | 250—219 X |
| 2,883,649 | 4/1959 | King | 250—227 X |
| 3,062,964 | 11/1962 | Lubin | 250—227 |
| 3,111,562 | 11/1963 | Shoji | 179—90 |
| 3,134,834 | 5/1964 | Tobias et al. | 235—61.12 X |

FOREIGN PATENTS

| | | |
|---|---|---|
| 725,509 | 3/1955 | Great Britain. |

RALPH G. NILSON, *Primary Examiner.*

WALTER STOLWEIN, *Examiner.*

M. A. LEAVITT, *Assistant Examiner.*